June 26, 1934.  E. NANFELDT  1,964,591
LIGHT PROJECTING DEVICE
Filed March 2, 1931   3 Sheets-Sheet 1
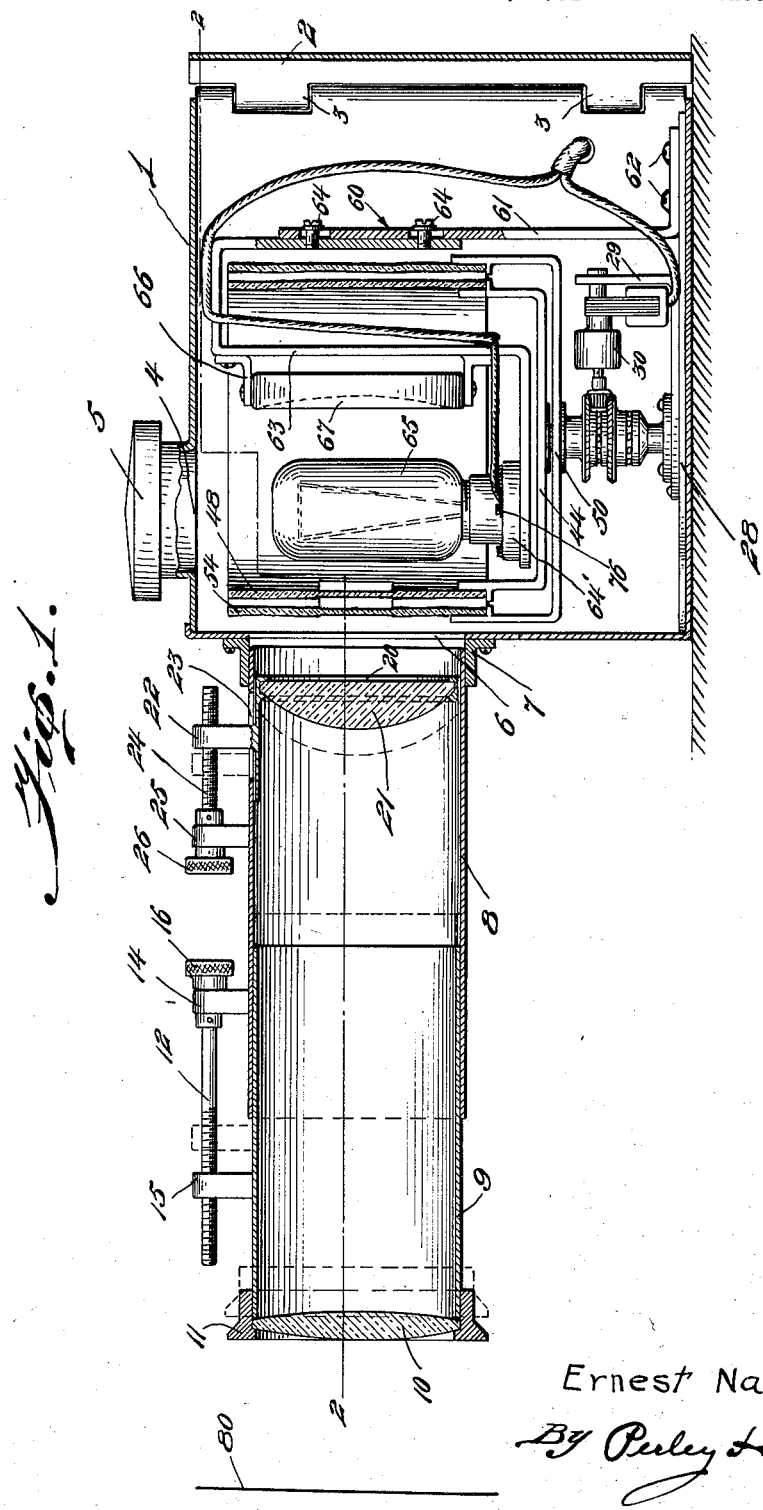
Inventor
Ernest Nanfeldt
By Purley H. Pearts
Attorney

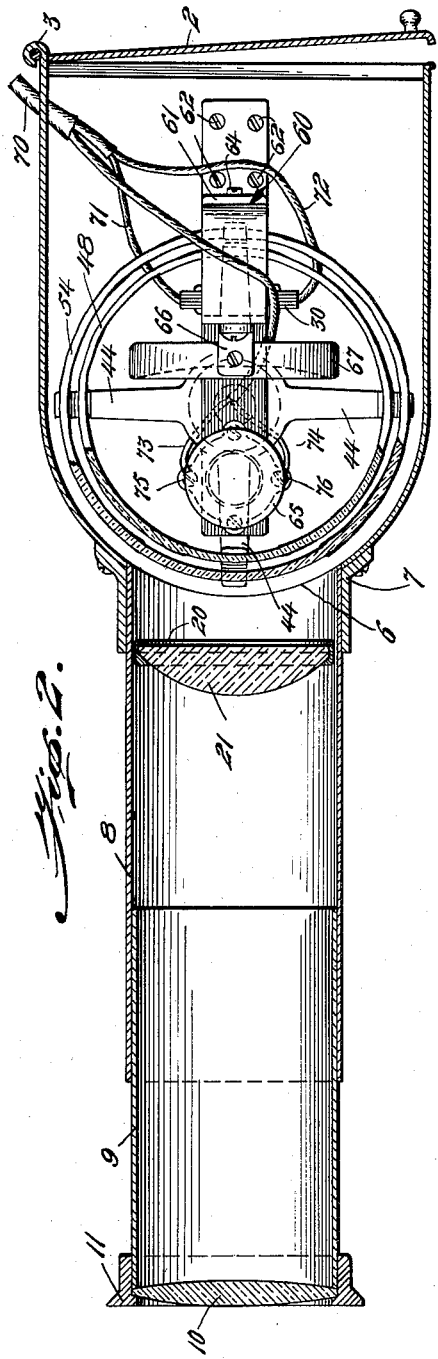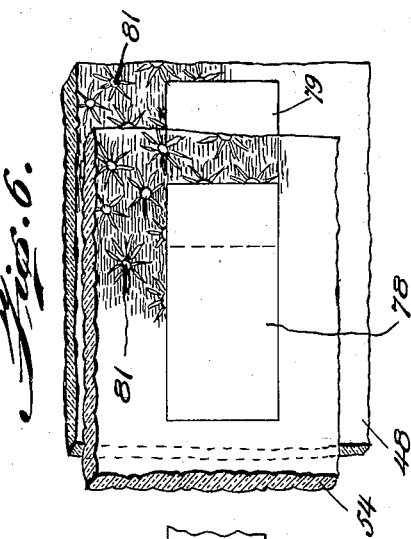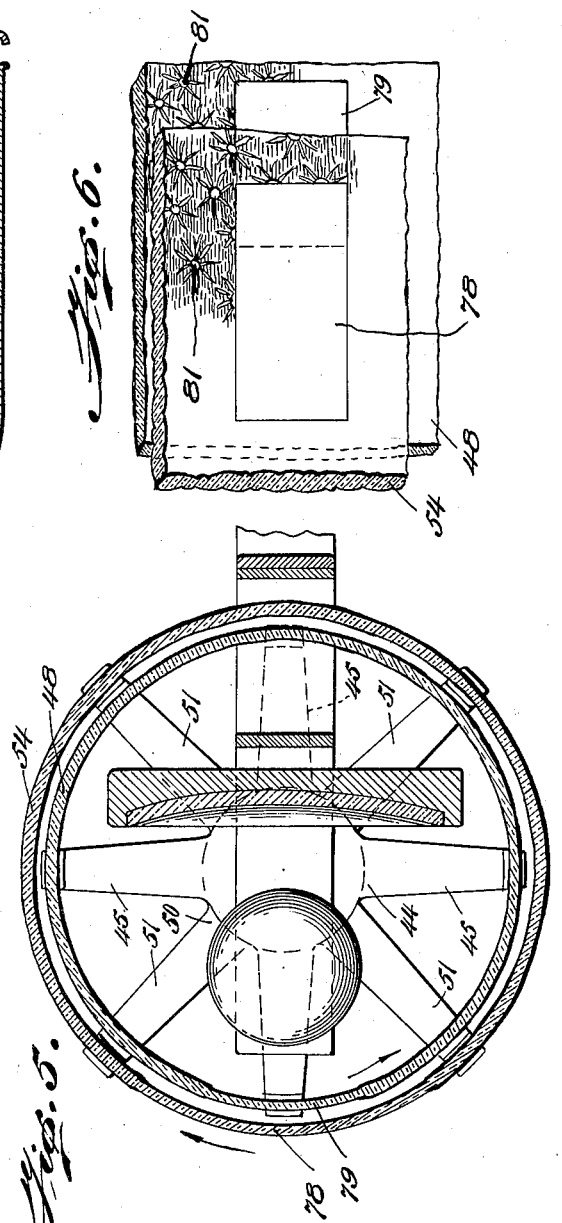

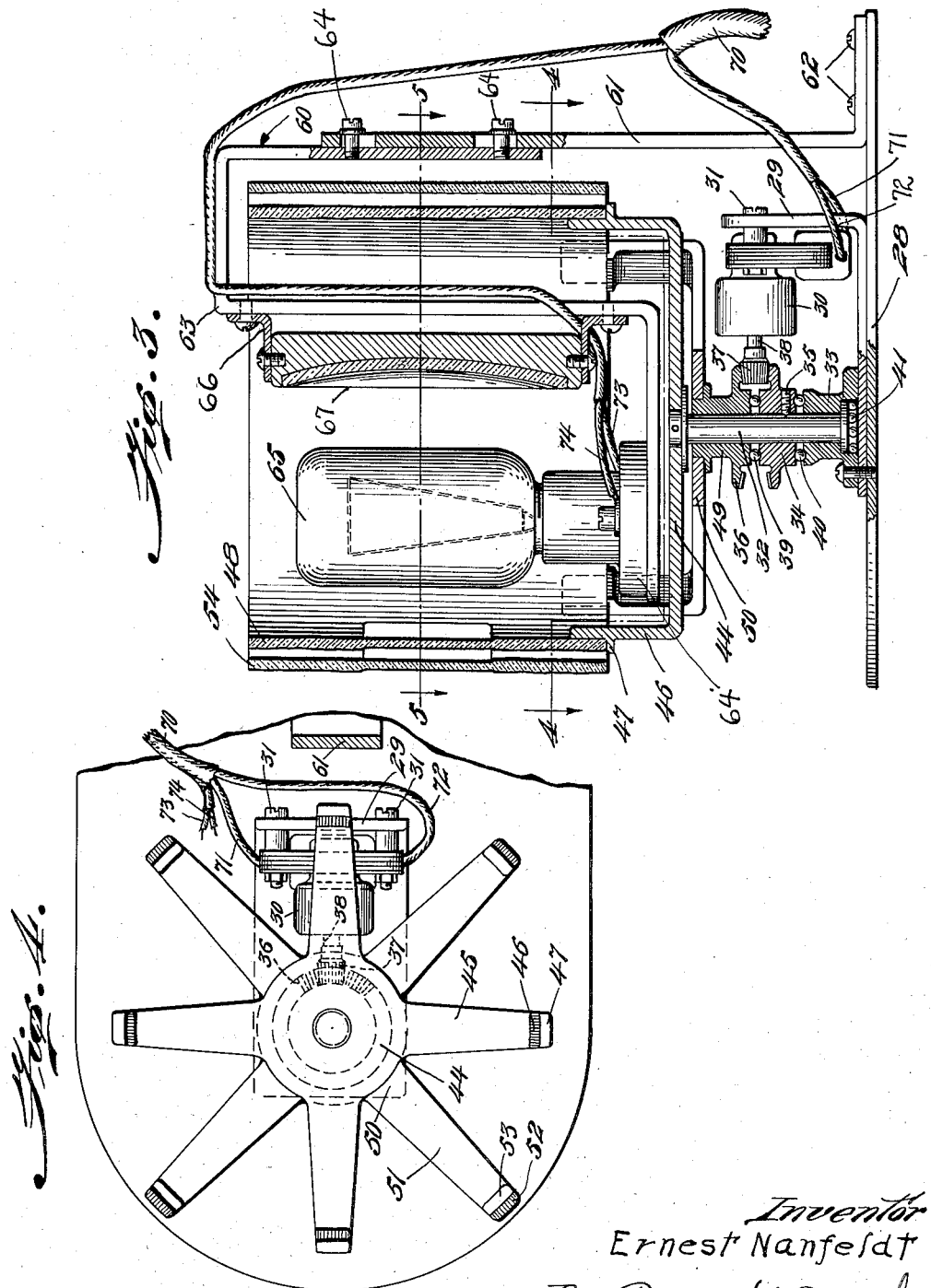

Patented June 26, 1934

1,964,591

UNITED STATES PATENT OFFICE 1,964,591

LIGHT PROJECTING DEVICE

Ernest Nanfeldt, New Haven, Conn., assignor to Respro, Inc., Cranston, R. I., a corporation of Rhode Island Application March 2, 1931, Serial No. 519,303

12 Claims. (Cl. 88—24)

This invention relates to an improved light projecting device adapted for use in producing ornamental and changeable lighting effects and in projecting illuminated advertisements in such a manner as to give the same novel and pleasing effects.

One object of the invention is the production of simple and efficient means for producing novel lighting effects wherein ornamental and changeable designs are projected upon a light receiving surface in such a manner as to produce a variety of designs which change in accordance with a prearranged plan.

Another object of the invention is the provision of a novel form of projection mechanism wherein advertising matter may be displayed in conjunction with novel and ornamental lighting effects which are capable of being varied as desired and to which may be imparted different colored effects depending upon a predetermined design.

A further object of the invention is the provision of transparent or translucent light transmitting members movable across the path of reflected light and provided with portions having ornamental designs formed therein as an integral part of the transparent or translucent material whereby constantly changing lighting effects may be produced upon movement of the members relative to each other.

Another object of the invention is the provision of two or more relatively movable light transmitting members formed of transparent or translucent material having the surfaces thereof cast or engraved to produce areas of different thicknesses whereby light rays passing through such areas are bent out of their normal course, together with means for imparting movement to one or more of the light transmitting members whereby they are caused to move relative to each other.

A further object of the invention is the provision of an improved lighting mechanism of this character provided with concentrically positioned light transmitting members adapted to surround a source of light and means for imparting rotative movement to the light transmitting members to cause them to move in opposite directions relative to each other.

Another object of the invention is to provide a system of lenses in conjunction with a source of light and one or more light transmitting members having portions located between the source of light and the system of lenses together with means for imparting movement to the light transmitting members for effecting constant changes in the light rays prior to their passage through the system of lenses.

Other objects and advantages of the invention relate to various improved details of construction and novel arrangements of the parts as well as certain improved methods for utilizing the same which will be more fully set forth in the detailed description to follow.

Referring to the drawings:—

Fig. 1 is a vertical sectional view through the light projecting device showing the relative position of the operating elements and their relation to the enclosing casing, Fig. 2 is a horizontal sectional view of the device, taken substantially along the line 2—2 of Fig. 1, Fig. 3 is an enlarged sectional view of the light projecting unit showing the position and the arrangement of the operating parts and illustrating their relation to the supporting plates, which are shown in side elevation, Fig. 4 is a horizontal view, partially in section, taken substantially along the line 4—4 of Fig. 3, Fig. 5 is a horizontal view, showing the light transmitting members in section, and taken substantially along the line 5—5 of Fig. 3, and, Fig. 6 is a perspective view of portions of the light transmitting members, showing the same as cast, engraved or otherwise formed to present ornamental designs through the movement of portions of the light transmitting members, and having cooperating plain portions adapted to register with each other at intervals to display any desired slogan or advertising matter.

In the embodiment of the invention illustrated herewith 1 designates a main casing which may be formed from sheet metal or other desired material and which may be provided with a door 2 hinged to a portion of the casing as at 3.

The casing 1 may be provided with a ventilating opening 4 formed in the top of the casing to which is secured a ventilating cover 5. An opening 6 is provided in one side of the casing 1, and a connecting plate 7 is secured to the casing 1 surrounding the opening 6 for firmly supporting a tubular member 8. A second tubular member 9 has one end telescoped within the free end of the tubular member 8 and is capable of adjustment in a direction parallel with the axis of the tubular member 8. A magnifying lens 10 is positioned adjacent to the outer end of the tubular member 9 and is secured thereto by means of a suitable holding member 11. The tubular member 9 is capable of adjustment relative to the tubular member 8 by means of an adjusting screw 12 rotatably mounted in a support 14 carried by the tubular member 8 and provided with an externally threaded portion adapted to engage the internally threaded portion of a standard 15 which is secured to the tubular member 9. The adjusting screw 12 is held against longitudinal movement relative to its support 14, and the position of the tubular member 9 relative to the tubular member 8 may be varied as desired by turning the knurled head 16 of the adjusting screw.

A lens supporting frame 20 may be slidably mounted within the tubular member 8 and is adapted to support a condensing lens 21 for adjustable movement therein.

The supporting frame 20 is provided with a standard 22 which projects through a longitudinal opening 23 formed in the tubular member 8 and which is provided with an internally threaded opening adapted to receive the externally threaded portion of an adjusting screw 24. The adjusting screw 24 is rotatably mounted in a fixed support 25 carried by the tubular member 8 and is held thereby against longitudinal movement, while it is capable of rotation on turning the knurled head 26 to move the supporting frame 20 and lens 21 within the member 8. The adjusting screws 12 and 24 above described, may be employed to move the lenses 10 and 21 respectively relative to each other and properly adjust them to focus light rays passing through the tubular member 8 from the casing 1.

The light transmitting and modifying portion of the mechanism may be mounted upon a base plate 28 which serves to support this mechanism in such a manner as to permit its being placed within the casing 1 or removed therefrom as a unit. Secured to the base plate 28 is a holding plate 29 having a portion adapted to support an electric motor 30, the motor being secured thereto by a suitable connection 31. A vertical shaft 32 is rotatably mounted in a support 33 carried by the base plate 28 and has a beveled gear 34 secured thereto by pin 35, and a similar beveled gear 36 rotatably mounted thereon. The beveled gears 34 and 36 are so positioned as to each engage a beveled pinion 37 carried by the motor shaft 38, and anti-friction bearings 39 and 40 are interposed between the gears 34 and 36, and between the gear 34 and the support 33, respectively, to insure free rotative movement of the gears 34 and 36 relative to each other and the support 33. An anti-friction bearing 41 may also be interposed between the end of the shaft 32 and the holding plate 29. A supporting plate 44 is secured to the upper end of the shaft 32 and is provided with radial arms 45 having upturned ends 46 each of which is provided with an offset lug 47 adapted to support the inner light transmission member 48. The gear 36 has a sleeve 49 formed integral therewith and rotatably mounted upon the shaft 32, which sleeve carries a supporting plate 50 having radial arms 51, each of which has the end 52 thereof upturned and provided with an offset lug 53. The upturned ends 52 are adapted to receive a light transmission member 54 which rests upon and is supported by the lugs 53.

An adjustable support 60, which comprises a portion 61 secured to the base plate 28 by suitable fastening means 62, has a portion 63 adjustably secured to the upper portion of the support 61, as by suitable holding means 64, and is bent to extend within the light transmission members 48 and 54 and support a lamp base 64' which carries a lamp 65, as well as a frame 66 carrying a reflector plate 67. An electric cable 70 contains wires 71 and 72 adapted to be connected with the terminals of the motor 30, and wires 73 and 74 which are connected with the lamp terminals 75 and 76. The light transmission members 48 and 54 may be formed from glass or other suitable transparent or translucent material and one or both of these members may be cast or have the surface thereof stamped or engraved to form various figures or ornamental designs in the material from which the light transmission members are fashioned in such a manner that when light is projected through the movable light transmission members a constantly changing design will be thrown upon a screen, light receiving surface, bill-board or other object to be illuminated. The designs cast, impressed in or engraved upon the light transmission members may be so formed and the relative positions of the light transmission members so arranged that the designs will continually merge into each other in accordance with a prearranged plan to produce a changing design of any desired character. Any suitable coloring may be imparted to the entire design or to portions thereof, as produced by light rays passing through the light transmission members, by coloring all or a part of each light transmission member or by forming the light transmission members from suitably colored translucent material.

In the operation of the mechanism shown and described the base plate 28 carrying the light transmitting and modifying mechanism may be positioned within the casing 1 in such a manner that the reflector plate 67 and lamp 65 are in alignment with the center line of the tubular member 8, whereby when light rays are given off from the lamp 65 they may be reflected by the reflector plate 67 through the light transmission members 48 and 54, and through the tubular member 8 so as to pass through the condensing lens 21 and magnifying lens 10 and be thrown upon a light receiving surface 80.

When the light transmitting and modifying mechanism carried by the base plate 28 is placed within the casing 1, an electric current may be passed through the wires 71 and 72 to the motor 30, and through the wires 73 and 74 to the lamp 65. As current is passed to the motor 30, the motor shaft 38 is rotated thus rotating the shaft 32 and the sleeve 49 through the intermeshing gears 37, 34 and 36. As the shaft 32 and sleeve 49 are rotated in opposite directions by the motor 30, the plates 44 and 50 carried thereby are caused to rotate in opposite directions, thus imparting movement to the light transmission members 48 and 54 and causing them to travel in opposite directions relative to each other. As the light rays are given off from the lamp 65 they are reflected by the reflector plate 67 to cause them to pass through the light transmission members 48 and 54 and be modified by the designs carried by the light transmission members before they pass through the lenses 21 and 10 to strike upon the light receiving surface 80. In casting, engraving or stamping the designs upon the material from which the light transmission members are formed the thickness of the material is varied in accordance with the designs, and as a result, the rays of light passing through the light transmission members are bent or deflected out of their normal course so as to form images upon the light reflecting surface which corresponds with the designs carried by the light transmitting members, and as the light transmitting members move relative to each other the images cast upon the light receiving surface may be caused to merge into each other or to cooperate to form particular shapes, figures, designs or images which may be made to grow or disappear or change their character as the light transmission members move relative to each other. It is to be understood that the relative position of the light transmitting members may be so arranged and their relative speed of rotation so adjusted as to enable these effects to be obtained by suitable timing of the light transmission members relative to each other.

The outer light transmission member is adapted to move in a clock-wise direction as viewed from above and the inner light transmission member is moved in a counter clock-wise direction when viewed from above, as more particularly illustrated in Fig. 5 of the drawings. This arrangement of the light transmission members and manner of rotating the same is particularly adapted for use when advertising matter or the like is to be displayed by placing the same upon the plain unornamented surface of the outer light transmission member.

The lenses 21 and 10 may be adjusted by means of the adjusting screws 24 and 12 to focus the light rays upon the surface to be illuminated. When desired the light transmitting members 48 and 54 may each be provided with one or more plain portions which may be utilized for displaying any desired advertising matter. In practice it is found desirable to form the plain, unornamented portion 78 of the outer light transmitting member 54 of approximately twice the length of the plain, unornamented portion 79 of the inner light transmitting member 48 in order that the advertising matter may be displayed without having superimposed thereon any portion of the ornamental design carried by either of the light transmitting members. The ornamental design carried by the light transmitting members 48 and 54 may comprise depressions 81 cast or engraved therein as indicated on Fig. 6 of the drawings, or such designs may consist of portions raised above the general surface of the light transmitting members, but in either case they are preferably formed integral with the material from which the light transmission members are formed, instead of being painted, stenciled or otherwise placed upon the surface of the light transmitting members.

These depressions or raised portions formed in the material from which the light transmission members are made result in producing light transmission members of variable thickness whereby light rays passed therethrough are deflected or bent out of their normal courses, and as these variations are subject to constant change with the movement of the light transmission members a constantly changing design is thrown upon the light receiving surface. With the use of a pair of such light transmission members which are caused to travel in opposite directions the designs formed upon a light receiving surface by each light transmission member may be caused to coact with each other by suitably timing the movement of the light transmission members so as to build up changing shapes or designs of any desired character.

While I have shown and described one form which my invention may assume in practice it is to be understood that various changes may be made in the form, proportions and arrangements of the parts as well as in the manner of utilizing the same without departing from the spirit and scope of my invention as set forth in the appended claims, which are to be broadly construed in the light of my disclosure.

What I claim is:—

1. In a device of the character described, a system of lenses, a source of light, continuous light transmitting members having portions of varying light transmissibility surrounding said source of light and having portions thereof continually interposed between said source of light and said system of lenses, and having all parts thereof located in a line at right angles to their paths of movement across the light source movable at a uniform rate of speed and means for imparting movement to said light transmitting members whereby they are caused to move in opposite directions about said source of light to produce variations in the light effects transmitted through said lenses from said source of light.

2. In a light projecting device of the character described, relatively rotatable concentrically arranged cylindrical light transmitting members each having portions of varying light transmissibility, a fixed light source and reflecting surface positioned within said cylindrical members, and means for positively rotating said cylindrical members simultaneously in opposite directions to produce a constant definite relative movement of the light transmitting areas traversed by light rays from said reflecting surface.

3. In a light projecting device of the character described, relatively rotatable concentrically arranged cylindrical light transmitting members each of which is provided with continuous light transmitting areas of varying thickness to deflect certain of the light rays passing therethrough out of their normal paths and form changing designs upon a light receiving surface, a fixed light source and reflecting surface positioned within said cylindrical members, and means for rotating said cylindrical members to produce relative movement of the light transmitting areas traversed by the light rays from said reflecting surface.

4. In a light projecting device of the character described, a rotatable supporting member, a sleeve carried by said supporting member and rotatable relative thereto, means for rotating said member and sleeve in opposite directions, cylindrical light transmitting members each having portions of varying light transmissibility carried by said supporting member and sleeve respectively and positioned one within the other for relative rotation about the axis of said supporting member, a fixed support mounted outwardly of and having a portion projecting within said light transmitting members, and a stationary light source and reflecting surface carried by said fixed support and located within said light transmitting members for passing light rays through said light transmitting members during the relative rotation of said members.

5. In a light projecting device of the character described, a stationary light source, a fixed reflecting surface located upon one side of said light source for reflecting light rays from said light source, bodily movable endless light transmitting members mounted for movement across the path of reflected light upon the opposite side of said light source from said reflecting surface and mounted for uniform transverse movement across the path of reflected light whereby desired designs may be thrown upon a light receiving surface without angular distortion, each of said light transmitting members being provided with portions of varying thicknesses to deflect certain of the light rays passing therethrough out of their normal paths and form changing designs upon the light receiving surface, and means for moving said light transmitting members.

6. In a light projecting device of the character described, a light source, a reflecting surface located upon one side of said light source for reflecting light rays from said light source, bodily movable endless light transmitting members mounted for movement across the path of reflected light upon the opposite side of said light source from said reflecting surface and mounted for uniform transverse movement across the path of reflected light whereby desired light designs may be thrown upon a light receiving surface without angular distortion, each of said light transmitting members being provided with portions of varying thickness to deflect certain of the light rays passing therethrough out of their normal paths and form changing designs upon the light receiving surface, and means for imparting regular and continuous movement in opposite directions to said light transmitting members.

7. In a device of the character described, a rotatable supporting member, a sleeve rotatably mounted upon said supporting member, means for rotating said supporting member and sleeve in opposite directions, cylindrical light transmitting members carried by said supporting member and sleeve respectively and concentrically mounted relative to the axis of the supporting member, and a fixed support located outwardly of the cylindrical light transmitting members and having a portion positioned within said cylindrical light transmitting members for supporting a reflector member and light source in position to reflect light rays from said light source through said light transmitting members, said light source and reflector member being mounted for adjustment in a direction axially of said light transmitting member.

8. In a light projecting device of the character described, a pair of cylindrical light transmitting members having continuous light transmitting portions arranged substantially concentric with each other and mounted for relative movement in opposite directions, said light transmitting members each being provided with light deflecting areas and non-light-deflecting areas, a light source and reflector member positioned within said light transmitting members for reflecting light rays therethrough, and means for rotating said light transmitting members in opposite directions so that the non-light-deflecting areas are brought into registery with each other periodically.

9. In a light projecting device of the character described, a light source and reflector member, a pair of endless light transmitting members having continuous light transmitting portions and mounted for movement relative to each other across the path of reflected light from said reflector member, said light transmitting members being each provided with an area of varying thickness and an area of uniform thickness, and means for rotating said light transmitting members so that the areas of uniform thickness in said light transmitting members are caused to register with each other periodically in traversing the path of reflected light from said reflector member.

10. In a light projecting device of the character described, a light source, a reflector member mounted to reflect light rays from said light source, a pair of light transmitting members spaced from each other and positioned upon that side of said light source opposite to said reflector member and in position to be traversed by light rays from said reflector member, said light transmitting members being each provided with a light deflecting area and a non-light-deflecting area and means for moving said light transmitting members across the path of light rays from said reflector member so that the non-light-deflecting areas of said members are brought into registery periodically during their passage across the path of the reflected light rays.

11. In a device of the character described, a pair of cylindrical light transmitting members positioned one within the other and each provided with a light deflecting area and a non-light-deflecting area of limited extent, a source of light located within said cylindrical members, and means for rotating said cylindrical members to bring the non-light-deflecting areas of said members into radial alignment with each other periodically.

12. In a device of the character described, a pair of cylindrical light transmitting members positioned one within the other and each provided with a light deflecting area and a non-light-deflecting area of limited extent, a source of light located within said cylindrical members, and means for positively rotating said cylindrical members to produce changing designs upon a light receiving surface.

ERNEST NANFELDT.